May 13, 1969   A. L. CHANEY ET AL   3,443,908
APPARATUS FOR THE PRODUCTION OF PETROLEUM COKE
HAVING AN IMPROVED PRECOMBUSTOR
Filed July 22, 1966

A. L. CHANEY
E. N. CART, JR.   INVENTORS

BY Llewellyn A. Proctor

PATENT ATTORNEY

United States Patent Office 3,443,908
Patented May 13, 1969

---

3,443,908
APPARATUS FOR THE PRODUCTION OF PETROLEUM COKE HAVING AN IMPROVED PRECOMBUSTOR
Allen L. Chaney and Eldred N. Cart, Jr., Baton Rouge, La., assignors to Esso Research and Engineering Company, a corporation of Delaware
Filed July 22, 1966, Ser. No. 567,149
Int. Cl. B01j *9/18;* F27b *15/14*
U.S. Cl. 23—284                                              7 Claims

ABSTRACT OF THE DISCLOSURE

A transfer line heater-precombustor combination for use in providing process heat to a reactor used for the thermal cracking of hydrocarbons, especially where the hydrocarbons are cracked within the reactor by contact with particulate fluidized coke, and the reactor is heated by circulation of coke between the fluidized bed of the reactor and the heater. The heater-precombustor combination includes two communicating refractory lined tubular members, the first a vertically oriented tubular member constituting a heater and the second, an upwardly titled tubular member constituting a precombustor. The angle of inclination, of the precombustor relative to the heater measured from horizontal, is greater than 0° and preferably ranges from about 15° to 75°. Means are provided within said precombustor for introducing fuel and oxygen, and for burning said fuel in the presence of oxygen to provide, in said precombustor, hot combustion gases wherein essentially all of the oxygen is reduced to provide carbon dioxide and water. The procombusted gases which enter into the heater, preferably tangentially, thus provide heat to the particulate coke and, inter alia, suppresses coke burn-up and refractory damage. The length:diameter ratio of the precombustor chamber is greater than about 2:1, and preferably ranges from about 4:1 to about 6:1.

---

Figure 1:
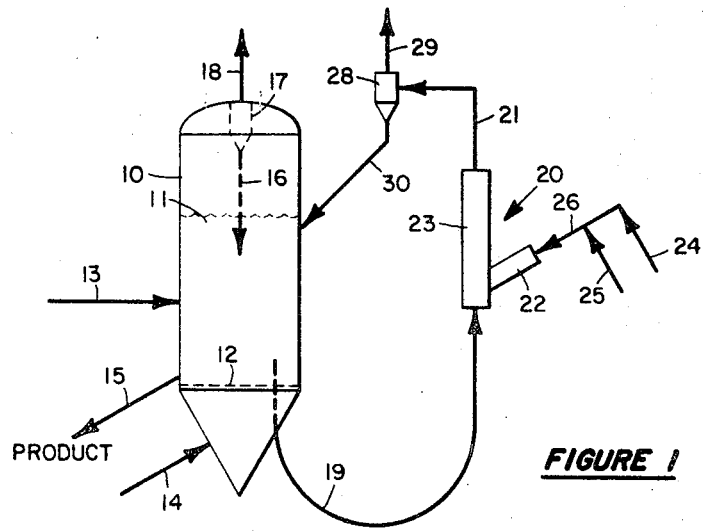

It is well known that hydrocarbons, particularly high carbon content hydrocarbons, e.g., heavy oils, pitch, residua, and the like, can be thermally cracked at temperatures ranging from about 900° F. to about 3000° F. In general, dependent largely upon pressure and contact time, the cracking of hydrocarbons at temperatures below about 1400° F. produces gaseous effluents containing saturated and unsaturated compounds, the boiling points of which fall within the range of motor fuels. On the other hand, temperatures above about 1800° F. produce gaseous effluents consisting largely of hydrogen; and, in fact, at temperatures above about 2000° F. the gaseous effluent is essentially hydrogen. In any case, coke is formed in the reactions.

Such processes are readily conducted by fluidized solids techniques, especially by use of reactors provided with transfer lines for circulation of the solids. Reactors equipped with transfer lines really consist of at least two vessels—viz, a reactor and a heater, these being interconnected and communicated one to the other to contain the reaction system. The reactor is generally a relatively large vessel, and the heater a smaller auxiliary vessel. In some instances process heat is supplied to a primary reactor by a transfer line heater, while a secondary reactor is heated by passage of coke between the primary and secondary reactor. In any event, the primary reactor contains particulate coke solids in a state of dense phase fluidization, i.e., a stage wherein the solids are contacted by and suspended with a stream of ascending gases so that the total gas-solids system takes on many of the characteristics of a boiling liquid, including a definite "liquid" level.

In the coking process, hydrocarbon feed stock is generally sprayed directly into the fluidized bed through a plurality of nozzles while steam or other extraneous gas, or both, is injected into the bottom of the reactor to fluidize the coke solids particles. The hydrocarbon feed stock comes into contact with and covers the coke particles, immediately cracking and vaporizing but leaving a solid residue on the individual coke particles which grow by accumulation of the residue upon their external surfaces.

The coking reactions are endothermic and hence to supply process heat, the coke solids particles are circulated between the reactor and heater. Thus, coke solids from the bed of the reactor are continuously transferred, geneally in dilute phase, through the transfer line heater. Therein the temperature of the coke solids is elevated, and thence retransferred to the bed of the reactor. Heat for the reactions is generated entirely within the burner and heat therefor is supplied by burning fuel, e.g., hydrogen or natural gas, with oxygen or an oxygen-containing gas, e.g., air.

The coke product, per se, can constitute a quite valuable product and its recovery in maximum yield is desired. In reactors provided with transfer lines, a considerable amount of the product coke is lost by gasification. In fact, generally the gasification level ranges as high as about 20 percent, and higher, in high temperature processes because of the continuous recirculation that is necessary. It is believed that gasification is produced by reaction between coke and steam, carbon dioxide, and oxygen. A major disadvantage in these processes, also, is that very finely divided carbon or soot is formed and this, and other solids, has a tendency to four process equipment.

It is accordingly the primary object of the present invention to obviate these and other disadvantages in reactors provided with transfer line heaters. In particular, it is an object to suppress or inhibit certain or all of these gasification reactions and thus to increase the yield of coke which can be recovered from a transfer line process. More particularly, it is an object to provide apparatus which will virtually eliminate the coke-oxygen reaction and greatly suppress gasification caued by reaction of coke with steam and carbon dioxide and thereby decrease coke consumption or burn-up. It is a further object to provide apparatus which will facilitate the use of vaporous fuels for heating coke, to stabilize the reactions and lessen the possibility of flame-outs.

These and other objects are achieved in accordance with the present invention which contemplates a new and improved transfer line-heater-apparatus combination. In particular, a novel precombustor device is located within the lower portion of the transfer line heater. Its function is to combust or pre-burn the fuel with oxygen (or oxygen containing gases) while avoiding contact of the combusting mixture with the coke. One purpose thereof is to minimize or eliminate contact between hot coke and unreacted or free oxygen. Thus, the fuel is burned with an intensely hot flame for time sufficient to consume essentially all of the oxygen. The combusted or "precombusted" fuel is then injected while hot into the lower portion, or heater portion, per se, of the transfer line heater and into contact with the coke, while the latter is suspended in dilute phase in a coke-carrier gas mixture entering the transfer line heater.

In a preferred embodiment, the combustion gas mixture is injected tangentially into the precombustor to reduce the temperature of the walls. The swirling gases also create a flow pattern which tends to lessen coke burnup.

The heater section and precombustor section are each constituted of generally tubular members, the latter entering and opening tangentially into, and being terminated within, the heater section. The members are constituted of refractory lined outer shells which intersect to form an intermediate branched portion within the transfer line. A feature of the precombustor is that the length of the tubular opening is at least about two times greater than its cross-sectional diameter. In other words, the length:diameter ratio of the internal opening of the precombustor is at least about 2:1, because ratios lesser than about 2:1 create flow patterns wherein coke flows into the precombustor, this, inter alia, causing coke burnup. Flow through the precombustor section can be axial or tangential, preferably the latter. Where the flow is axial, however, it has been found that the length:diameter ratio must be least about 3:1. In either event it is preferable that the length:diameter is at least about 4:1, and preferably the length:diameter ratio ranges from about 4:1 to about 6:1. Ratios higher than about 6:1 can be employed, but the corresponding benefits obtained, if any, by increasing the ratio are insignificant and only add to the cost. It is believed that the length:diameter ratio must be greater than about 2:1 or 3:1, respectively depending upon whether the flow is axial or tangential, so as to smooth out the flow along any given cross-section of the precombustor section.

By providing the desired length:diameter ratio the rate of flow of gases along the sides of the precombustor section approach the rate of flow at the center of the member, and hence lessens the tendency of coke to flow along the sides of the member into the precombustor. Another disadvantage of flow of coke into the precombustor, however, is that, at the very high temperatures—viz, from about 3400° F. to about 3600° F., the coke reacts with the refractory lining of the burner, this resulting in some damage to the lining.

The precombustor is mounted at an angle of inclination from horizontal greater than 0°, and preferably the angle ranges from about 15° to about 75°. More preferably the angle ranges from about 30° to about 60°. In other words, the precombustor is mounted so that the jet of combusting gases emanating therefrom is projected at least slightly downwardly into the transfer line rather than horizontally or upwardly into the transfer line. Mounting of the precombustor in this fashion has been found to provide better flame stability and eliminates flame-outs. Mounting the precombustor in this fashion further suppresses the tendency of coke to enter into the precombustor.

The invention will be better understood by reference to the following detailed description and to the accompanying drawing to which specific reference is made.

Figure 2:
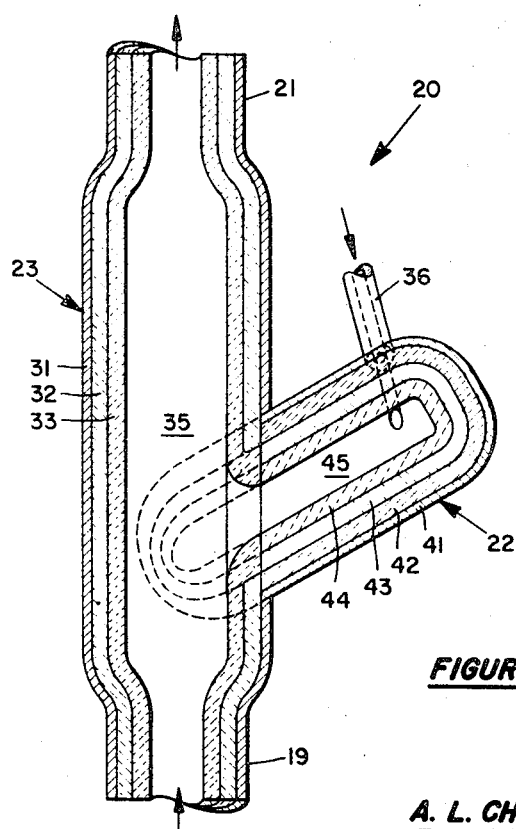

Referring to the figures:

FIGURE 1 depicts the overall reactor-transfer line heater combination, including in particular the transfer line-heater precombustor combination; and FIGURE 2 shows in detail the precombustor and heater portion, and the relation thereof to the transfer line.

Referring to FIGURE 1 of the drawings is shown a vertical, cylindrical vessel or reactor 10 with enclosing walls at its upper and lower ends. The reactor 10 is operatively communicated with the auxiliary vessel 20 which provides process heat for the overall system.

A porous or perforated grid 12 is extended horizontally across the side walls at the bottom of reactor 10, and across the flow path of fluidizing gases entering the reactor 10 to provide support for a dense phase fluidized bed 11 of particulate coke. Preheated residua or pitch is injected, e.g., via line 13 into the fluidized bed 11 and cracked, while coke product is withdrawn from reactor 10, e.g., via line 15. Steam or other suitable carrier gas, e.g., carbon dioxide, nitrogen, hydrogen, normally gaseous hydrocarbons, and the like, can be injected into the bottom of reactor 10 via, e.g., a plurality of nozzles, represented via line 14, to aid in the fluidization, if desired.

Effluent gases from the thermal cracking reactions are passed from the top of reactor 10 via a cyclone separator 17, or separators, through line 18. Entrained cone particles are separated and returned from separator 17 through a dipleg 16 to fluidized bed 11.

Coke solids particles are transferred in dilute phase from the bottom of the bed 11 of reactor 10 along with process gases via riser 19 and passed through the transfer line heater 20. After heating, the particles are thence returned, via line 21, to the cyclone separator 28. Flue gases are evolved via line 29 and particulate hot coke solids are returned via the dipleg 30 to the fluidized bed 11. On passage through the heater 20, the temperature of the coke particles is thus elevated sufficiently to maintain the desired process heat in fluidized bed 11.

The transfer line heater 20 is comprised of a tubular heater portion 23 and a tubular precombustor portion 22. Fuel and oxygen are burned, combusted, or "precombusted," in precombustor 22 and the burnt gases then injected into portion 23, and into contact with the coke particles which ascend through tubular heater portion 23. Fuel and oxygen for precombustor 22 can be injected therein, e.g., via line 26. The fuel and air can be introduced therein through separate lines or through a common line 26 into which is introduced fuel and an oxygen containing gas such as air, e.g., via lines 24, 25.

Referring to FIGURE 2 is shown in more detail the characteristics of the transfer line heater-precombustor combination 20. The precombustor portion 22 is constituted of an outer pressure shell 41, generally of a ferrous metal alloy, e.g., carbon steel. The inside of the precombustor 22 is lined with a plurality of layers of refractory 42, 43, 44. Next to the metal shell 41 is generally provided a layer of conventional hydraulic setting, insulating refractory 42. The cylindrical wall 44 which forms the precombustor chamber or "fire box" is constituted of fire brick placed together with or without mortar. Between wall 44 and refractory lining 42 is provided a loose aggregate of refractory material, or any other insulating refractory compatable with the system.

A line 36, which carries premixed fuel and oxygen, enters into the precombustor chamber 45. Preferably the line 36 is mounted tangentially to provide a swirling, gaseous mixture which flows about the wall 44 of chamber 45 prior to entering into the heater portion 23. The fuel burns with an intensely hot flame and essentially all of the oxygen is reduced to carbon dioxide and water prior to injection of the products of combustion into the heater 23. The fuel and oxygen, e.g., air, which enter the combustion chamber are ignited therein, usually at the point of entry wherein line 36 enters into the precombustor chamber 45.

The ignition system (not shown) can be constituted of a one-quarter inch diameter steel rod at the exit from the chamber 45, which rod is electrically insulated from the metal portion of the metal walls and connected to a high voltage transformer. It has, e.g., been found that a reliable spark can be produced by employing about one-eighth inch gap while using a 10,000-volt transformer.

The heated portion 23 is also constituted of a metal shell 31 lined with, generally, a plurality of refractory materials 32, 33. Because of the lesser temperatures in the chamber 35, however, a lesser amount of refractory is required. The size or inside diameter of the heater chamber 35 is related to the contact time which is desired between the combustible mixture and the coke particles which enter the heater chamber 35 via ascent through line 19. Thus, e.g., the gas may enter the chamber 35 at a temperature of about 1600° F., and the size of the chamber will be determined by the desired contact time which, in itself, is related to the total gases, and temperature thereof, which must be handled within the chamber 35.

As stated, a critical relationship exists between the angle in which the precombustor enters into the heater. Thus, the angle formed by the center line or central axis through the precombustor chamber 45 and a center line or central axis through the heater defines an angle of inclination, measured from horizontal, which is greater than 0°, and preferably the angle ranges from at least about 15° to about 75°, and more preferably from about 30° to about 60°. Further, the length of the precombustor chamber 45 ranges at least about twice the inside diameter of the chamber, or where an axial entry feature is employed, the length ranges at least about three times the diameter. Preferably, in any event, the length: diameter ratio ranges from about 4:1 to about 6:1.

EXAMPLE

To illustrate the invention, the reactor 10 is put into operation and provided with a fluidized bed of coke 11 operated at 2000° F. Coke, in dilute phase, at about 2000° F. is withdrawn from the bottom of reactor 10 and passed through line 19 to enter into heater 23 at a velocity of about 40 feet per second. Upon entering into the chamber 35 of heater 23, the coke is met by a swirling stream of precombusted hot gases ranging in temperature from about 3400° F. to about 3800° F. The combustion and carrier gas become mixed and the total gases move through the chamber 35 at about 50–100 feet per second, and at sufficient contact time, e.g., one-quarter of a second, to elevate the temperature of the heated coke to about 2200° F. Discharge of the heated coke via line 21 into bed 11 maintains the proper operating temperature of reactor 10.

The precombustor 22 is designed to enter into the heater 23 at an angle of inclination of 30°, measured from horizontal. The length:diameter of the precombustor chamber employed is 4:1.

Overall operation and gas solids contacting is very good. Stable operation is achieved. There are no flameouts, and coke does not enter into the precombustor. Coke burnup is substantially nil.

When the foregoing example is repeated, except that the length:diameter ratio of the combustion chamber of the precombustor is reduced to 2:1, operation is satisfactory, and only a small amount of the coke is burned. Where, however, the length:diameter ratio of the precombustor remains at 2:1, an axial entry of a fuel and oxygen mixture into the precombustor chamber is employed, coke flows into the precombustor, and coke burnup is quite severe. Moreover, the coke reacts with the refractory to some extent, this not only intensifying coke burnup, but also resulting in damage to the refractory.

Where the example is again repeated employing a precombustor length:diameter ratio of 4:1 with tangential feed, but wherein the precombustor chamber is projected vertically upwardly into the heater repeated flame outs result by entry of solids into the precombustor.

It is apparent that the invention is subject to some changes and modifications without departing the spirit and scope thereof. Hence, the claims are to be construed within the spirit and scope of the foregoing disclosure.

Having described the invention, what is claimed is:

1. In apparatus for forming gaseous and carbonaceous products by the endothermic cracking of an injected feed hydrocarbon by contact with hot particulate coke solids, the combination comprising
a reactor provided with feed inlet and product outlet means containing a fluidized bed of particulate coke,
a heater in communication with the reactor via transfer conduits whereby coke at relatively low temperature can be passed from the fluidized bed of the reactor to the heater, therein heated, and thence returned to the fluidized bed of the reactor,
a precombustor in communication with said heater,
means associated with said precombustor for introducing fuel and oxygen, and for burning said fuel in the presence of oxygen to provide within said precombustor hot combustion gases wherein essentially all of the oxygen is reduced to carbon dioxide and water,
said heater-precombustor including a pair of refractory lined tubular members, a substantially vertically oriented tubular member with an inside chamber, and a tubular precombustor provided with an inside chamber entering into the chamber of the tubular heater, the angle of entry defining an angle of inclination greater than 0°, measured from horizontal, and the length:diameter ratio of the precombustion chamber is greater than about 2:1.

2. The apparatus of claim 1 wherein a fuel-oxygen conduit enters transgentially into the precombustion chamber of the precombustor.

3. The apparatus of claim 2 wherein the length:diameter ratio of the precombustion chamber ranges greater than about 3:1.

4. The apparatus of claim 1 wherein the angle of entry of the precombustion chamber into the chamber of the heater ranges from about 15° to about 75°.

5. The apparatus of claim 4 wherein the angle of entry ranges from about 30° to about 60°.

6. The apparatus of claim 1 wherein the length:diameter ratio of the precombustion chamber ranges from about 4:1 to about 6:1.

7. The apparatus of claim 1 wherein the precombustor enters tangentially into the heater.

References Cited

UNITED STATES PATENTS

| 2,879,221 | 3/1959 | Brown | 208—127 |
| 2,902,433 | 9/1959 | Spitz et al. | 208—127 |
| 3,019,272 | 1/1962 | Steinhofer et al. | 208—127 |
| 3,111,395 | 11/1963 | Sweeney | 208—127 |

WILBUR L. BASCOMB, JR., Primary Examiner.

U.S. Cl. X.R.

23—288; 208—127, 164; 201—12, 31; 202—121